United States Patent
McMillan et al.

(10) Patent No.: US 9,295,863 B2
(45) Date of Patent: Mar. 29, 2016

(54) HAPTIC FEEDBACK FLOW INDICATOR

(71) Applicant: TASK FORCE TIPS, INC., Valparaiso, IN (US)

(72) Inventors: Stewart McMillan, Valparaiso, IN (US); David J. Kolacz, Plymouth, IN (US)

(73) Assignee: TASK FORCE TIPS, INCORPORATED, Valparaiso, IN (US)

( * ) Notice: Subject to any disclaimer, the term of this patent is extended or adjusted under 35 U.S.C. 154(b) by 149 days.

(21) Appl. No.: 14/194,017

(22) Filed: Feb. 28, 2014

(65) Prior Publication Data
US 2015/0246254 A1 Sep. 3, 2015

(51) Int. Cl.
| A62C 37/50 | (2006.01) |
| A62C 37/08 | (2006.01) |
| G01F 1/05 | (2006.01) |
| G01P 13/00 | (2006.01) |

(52) U.S. Cl.
CPC ............... *A62C 37/50* (2013.01); *A62C 37/08* (2013.01); *G01F 1/053* (2013.01); *G01P 13/004* (2013.01)

(58) Field of Classification Search
CPC .......... A62C 37/08; A62C 37/50; G01F 1/05; G01F 1/053

USPC .................. 116/112, 205, 273, 274, DIG. 17; 137/551, 557; 239/71, 72, 74
See application file for complete search history.

(56) References Cited

U.S. PATENT DOCUMENTS

| 3,804,336 | A | * | 4/1974 | Koeppe | B05B 1/00 239/383 |
| 4,945,948 | A | * | 8/1990 | Fischer | G01P 13/0073 116/274 |
| 6,604,548 | B2 | * | 8/2003 | Geisinger | F16K 1/22 137/521 |
| 7,195,181 | B2 | * | 3/2007 | Steingass | B05B 1/3073 169/14 |
| 7,464,766 | B2 | * | 12/2008 | Crabtree | A62C 31/12 137/98 |
| 7,730,847 | B1 | * | 6/2010 | Redd | A61M 16/08 116/112 |
| 8,366,672 | B1 | * | 2/2013 | Barton | A61M 19/00 600/461 |
| 2010/0059234 | A1 | * | 3/2010 | Combs | A62C 31/03 169/19 |
| 2014/0265336 | A1 | * | 9/2014 | Aubuchon, Sr. | F03B 13/10 290/52 |

* cited by examiner

*Primary Examiner* — Richard Alexander Smith
(74) *Attorney, Agent, or Firm* — Marshall, Gerstein & Borun LLP

(57) ABSTRACT

A new haptic flow indicator has a spinner that is mounted for rotation and provides a discernable haptic feedback to a firefighter when liquid flow through the indicator falls in a selected range.

10 Claims, 8 Drawing Sheets

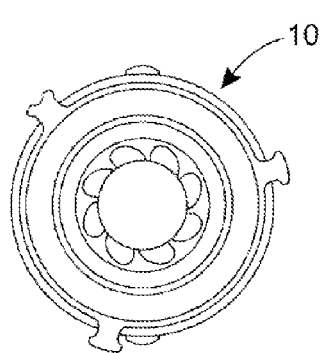
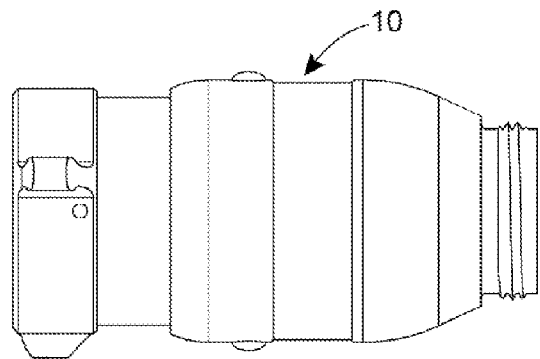
FIG. 2     FIG. 3

HAPTIC FEEDBACK FLOW INDICATOR

This device is for use in conjunction with a fire hose nozzle. Its purpose is to give haptic feedback to the firefighter only when the flow to the nozzle exceeds a minimum threshold value.

BACKGROUND

Firefighters attempt to extinguish burning materials using extinguishing agents such as water, water with foam, or dry chemicals under a variety of circumstances. When battling structural fires in homes, commercial buildings, apartments, garages and the like it has been found that an interior attach is the most effective because the fireman can bring the extinguishing agent to the fire and apply it directly at the fuel source, thereby extinguishing the fire using a handheld nozzle. Unfortunately, conditions within a burning structure are often times hazardous and include adversities such as a complete lack of visibility beyond the firefighter's mask as a result of the smoke and other airborne contaminates produced by the blaze. Therefore, firemen rely heavily on their sense of hearing to receive communications and ascertain fire conditions.

Fires produce heat. It is generally understood that a certain minimum flow is needed to absorb this heat and extinguish a fire. This is referred to as critical flow rate. Any less flow and there is insufficient extinguishing agent to overcome the heat of combustion, while any larger flow will extinguish the blaze. Efforts to extinguish a blaze with less than the critical flow rate are a futile waste of time and a needless risk to firefighters. It is common practice for fire departments to setup standard operating procedures (SOP) to establish a desired flow for a typical fire that will insure some reasonable chance of success. The procedure generally identifies which nozzle is to be used, the diameter and length of the hose, and the pump pressure that is desired, and the physical limitations of the hose handling crew.

However, there are a number of conditions that can cause the actual flow to differ from the desired flow. The conditions include kinked hoses (which restrict flow), use of a smaller diameter hose, a longer length of hose, inattentive pump operators, fire engine malfunction, use of an inappropriately sized nozzle, or of use of a nozzle whose orifice setting differs from that prescribed in the SOP. The firefighter's safety and chance of success is compromised if the difference reduces the flow significantly. For these reasons, it is common for firefighters to pre-flow the nozzle to verify the flow before beginning the attack on the fire. During this test, a firefighter can guess if the flow of the nozzle is adequate by assessing the stiffness of the hose and the nozzle reaction force. This type of subjective judgment is not consistent or accurate, and does not insure that conditions will remain constant once the attack has commenced.

Prior art flow indicators that provide visual feedback of the flow for firemen have been in use for many years. During a fire, it would be difficult or impossible for a firefighter to see these devices not only because of the limited visibility but also because these devices would be located at the entrance of the nozzle, which is in a position near the elbow of the arm holding onto the nozzle and out of the normal field of view when one is trying to see the glow emitted from the blaze itself.

While it is certainly possible to transmit visual signals by wire, or wirelessly from a fire hose flow sensing device to a firefighter's eyes, these solutions require sophisticated electronics and result in several modes of failure. For example, a heads-up display may have its battery run low, heat or shock may damage the electronics.

Some visual indicators used spinning elements. These indicators suffered the further drawback of the indicator spinning whenever there was flow through the nozzle, and thus providing little or no assistance in determining whether the flow is not merely present but also adequate.

Attempts at providing auditory feedback have not met with success because of the inconsistent noise level from fire to fire, and because auditory feedback diminishes the firefighter's critical ability to hear other sounds on the fire scene, including communications or other sounds on the fire scene that may signal dangerous conditions.

Furthermore, nozzle-mounted flow meters and flow indicators can add significantly to the length and weight of a fire hose nozzle, thereby diminishing the firefighter's effectiveness. For these reasons, firefighters generally use flow meters and flow indicators only as training aids, and avoid them for operational use within the fire because the devices are regarded ineffective and detrimental to extinguishing the blaze.

Of the remaining human senses, it is probably not practical to use smell or taste to define when the proper flow is reached.

What is left is the sense of touch. A disposition to use the sense of touch to determine the state or position of something is referred to as haptic. Use of the sense of touch could for example include detecting force, sensing hot, cold, itchy, sharp, or painful sensations, or even sensing electric shock. Each of these sensations could be used as feedback of a flow condition.

Of these, force may be the most practical haptic sensation because many tools used by people feed back some force sensation when being operated. For example, a fire hose nozzle produces force when flow and pressure generate nozzle reaction according to the relationship of F=MA (force equals mass times acceleration). However, inasmuch as a given mass of water can be accelerated to virtually any velocity, it is not possible with present day nozzles to equate with certainty a sensed force with a specific flow. The sensation that there is some nozzle reaction does not indicate that a specific flow is being delivered, only that some flow is being delivered. The sensation of nozzle reaction force is also affected by how the nozzle is grasped, if one is in a standing, kneeling, or lying position (as firefighters are prone to do to be safe), or if one is gripping the nozzle with bare hands or with full bunker gear and thick firefighter's gloves. Detecting a specific force is also a function of memory and experience, which are not always available, consistent, or reliable.

The sense of touch may also be used to detect a repetitive force, as might result from use of a jackhammer, jigsaw, or vibratory sander, or pneumatic ball vibrator. However, none of these vibrating devices have been employed to provide haptic feedback to a firefighter to indicate that a desired magnitude of water flow is being delivered.

What is desired then is a device that emits a haptic signal to a fireman that can be used to detect when a flow of water of a specific magnitude is achieved.

SUMMARY OF THE INVENTION

The applicants have developed a practical way to enable firefighters to gauge flow conditions using their sense of touch, specifically the sense of vibration. The use of vibration as a haptic feedback to a firefighter of nozzle flow is a new and unique invention.

The ideal indicator is small and lightweight, and is located in a position where its presence does not interfere with the normal hose handling techniques and habits of a firefighter. It should be positioned where the haptic feedback can be most readily felt. For a handheld device this is the hand since the hand grips the fire hose nozzle tightly and contains many nerves. In this way, the flow indicator can provide the fireman with haptic feedback of water flow.

The indicator must be robust inasmuch as it will be subject to extreme conditions such as shock, freezing, high heat, dirt, and sand. It may also sit for months or longer between uses and then be relied on to operate. It should not have electronics that create an ignition source. The preferred device is powered solely from the motive energy of water flowing through the indicator.

The device should ideally allow the firefighter to differentiate between when the flow is adequate and when the flow is not. Therefore, it should include a set point dividing the operating flow range of the indicator into two regions of operation including a first region when the haptic feedback should not occur and a second region when the haptic feedback should occur.

While a haptic vibration could be produced by an oscillatory device like a buzzer or jackhammer piston, it is preferentially derived from a rotating element whose mass rotates about an axis that is not coincident with the centroid of mass of the element.

The indicator is best placed at the inlet of the nozzle so that it does not change or interfere with any function or require redesign of any existing fire hose nozzle. Being located at the inlet, it is preferred that the indicator includes a water inlet to receive water from a fire hose and a water outlet. The indicator may be configured to discharge directly into a fire hose nozzle; however, it can also serve for use with more than one nozzle if the indicator's water outlet includes a fire hose connection All devices are subject to failure, and indicators are no exception. Ideally, a firefighter can remain safe under such a failure. If the indicator does not rotate until the flow reaches a certain minimum set point flow, then a firefighter may avoid entry into the conflagration if the indicator fails. This is safer than an indicator that provides the feedback before the set point is reached.

In another embodiment, the indicator may be adjustable so that the set point can be calibrated. In addition, because the set point desired may not always be the same value, it may be desirable to be able to adjust the indicator to more than one set point according to the preferences and needs of the SOP's of the particular fire department.

While haptic feedback is preferred, it is understood that visual feedback could augment the haptic sensation for circumstances in which visibility is not obscured. So, for example, the indicator could have a window that allows observation of a rotating element, or the rotating element could include a magnet that, when rotated, produces electricity to light an LED light or display. The electricity for a visual display alternatively could be provided by a battery. In another embodiment, electricity generated by the rotating element could drive speakers to give auditory feedback, or auditory feedback could be produced by a protrusion on the rotating element that could strike a clicker, ring a bell, or make a buzzing noise.

If desired, the indicator can include a device to store energy, such as a battery or capacitor.

One skilled in the art may combine all these elements into various configurations, all providing essentially the same service to the firefighter.

BRIEF DESCRIPTION OF THE DRAWINGS

FIG. 2 is an end view depicting the inlet of the indicator shown in FIG. 1

FIG. 3 is a side view of the indicator in FIG. 1

DETAILED DESCRIPTION

The most preferential haptic flow indicator 10 is depicted in FIGS. 1-8. A fire extinguishing agent such as water or a foam solution enters the indicator on the left hand side of the page by way of an inlet 12 through a fire fighting hose connection. The most prevalent type of connection used in the in USA for handheld nozzles is a female 1.5" National Hose thread according to National Fire Protection Association standard NFPA 1963, but other thread sizes, types, genders may also be used. The indicator may have the fire hose connection integrally formed into the inlet of the indicator, or alternatively the inlet may include a fire hose coupling affixed to the distal end in a non-rotating manner, or so that it can rotate with respect to the inlet by use of a sliding fit or by bearing balls. A sealing connection to the fire hose discharge is made by use of a fire hose gasket of the like.

Figure 9:
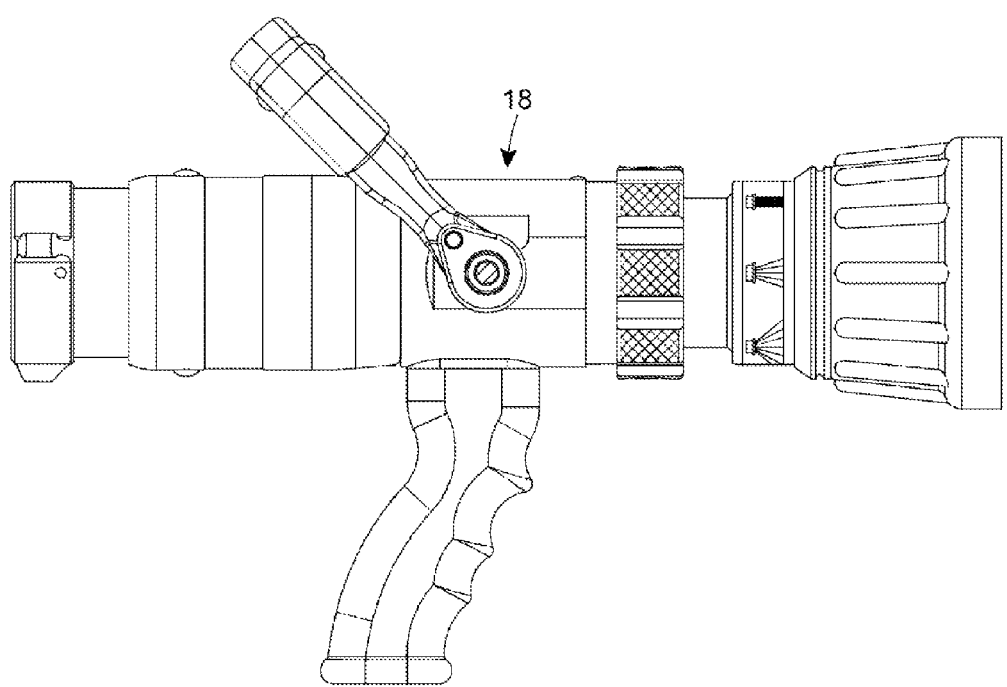
FIG. 9 is a side view of another type of haptic flow indicator which acts as the inlet coupling of a fire hose nozzle

Water travels through the indicator and is discharged to the right through the outlet 14. The outlet may include a fire hose connection such as male fire hose threads. The size, type, and gender of the fire hose connection may be identical to the inlet or of any other type desired. Alternatively, as depicted in FIG. 9, the outlet may be permanently connected to the inlet of a fire hose nozzle, either by way of a rotating joint or as an integral portion of the inlet of a unitized nozzle 18.

Referring back to FIGS. 1-8, the inlet and the outlet are secured to each other by a threaded joint that restrains the force of water under pressure and provides an axial alignment between the inlet and outlet. Liquid from within the indicator is prevented from escaping out of the threaded joint by an O-ring seal 22 on the exterior of the inlet that contacts a bore 24 within the outlet. The axial position of the threaded joint is retained by a pair of pan head screws 26, which are threaded into holes in the outlet and engage slots on the exterior of the inlet to prevent rotation between the inlet and the outlet.

Varying the axial position of the outlet varies the compressed height and force upon a compression spring 30 located in an annular void between the inlet and the outlet. The spring exerts a spring force on a sleeve 32 that forms portions of the confines of the annular void that houses the spring. Forces on the sleeve are exerted on a race of bearing balls 40 engaged between the end of the sleeve, the interior of the inlet, and a step 42 on a spinner 44. In this way, the balls form a thrust bearing as well as provide radial location and resist side forces (axial load). The spinner includes a second race of balls 50 engaged in a spinner groove 52 also positioned in the interior of the inlet. The second ball race also provides radial location and resists side forces but cannot resist axial loads. In this way, the spinner is supported for spinning in a prescribed manner. The force of the spring biases the spinner against a polymer washer 60 on a stepped face 62 within the inlet. By adjusting a spring preload, the spinner can be held against the washer with more or less force.

The spinner 44 is positioned within the confines of the inlet and also includes a waterway 65 that receives flow from the inlet and delivers it to a bore on the sleeve. From there, the flow proceeds to the outlet. One segment 67 of the waterway has slanted surfaces that impart a moment that tends to rotate the spinner under the influence of flow through the waterway. Initially, however, rotation of the spinner will be resisted by frictional drag of the spinner against the polymer washer 60. When axial force from the water is great enough to overcome that frictional drag, the spinner may move downstream slightly, opening a clearance with the polymer washer and allowing the spinner to spin freely under the impetus of the water. By selectively changing the preload, the spinner can be made to commence spinning at any desired water velocity, hence flow, since velocity is directly proportional to flow.

Adjustment of spring preload is desirable from two standpoints. First, it allows calibration of the set point. The axial force of any two springs may differ slightly due to tolerances, and the tolerances of not only the spring but also other components within the assembly may make calibration of the spring preload desirable. Secondly, axial adjustment of the spring preload can be used to change the set point from one value to another. For example, possible desired settings for a 1.5" nominal waterway could be 95 GPM, 125 GPM, 150 GPM, and 185 GPM. Correspondingly higher flow settings could be desirable for larger diameters, and smaller settings could be desirable for smaller diameters. In the illustrated indicator, the adjusted set point position is retained by the pan head screws and is preferentially field changeable. Suitable markings on the exterior of the indicator may be provided to locate a particular set point, or depict adjustment positions for multiple set points.

The axial travel of the spinner 44 as it is released from contact with the polymer washer 60 during rotation is controlled by a gap between the sleeve 32 and a retaining ring 70 that engages a groove 72 within the bore of the inlet. Preferentially, this gap is quite small so as to inhibit ingress of dirt and sand particles in the water past the clearances around the polymer washer and then to the ball races, where these particulates would tend to inhibit rotation of the balls and spinner. The preferred gap of 0.004" is too small to be seen in FIG. 4. Clearances between balls and their races grow progressively larger further downstream because any particle entering past the polymer washer is moving into an ever-increasing space, thus making it likely that the particle will be discharged through the axial gap between the end of the spinner and the end of the sleeve. Flow of liquid in this direction is assured because with velocity there will be a parasitic pressure drop from the inlet of the spinner to the exit of the spinner owing to its length and pressure loss arising from contact with the slanted surfaces.

Figure 6:
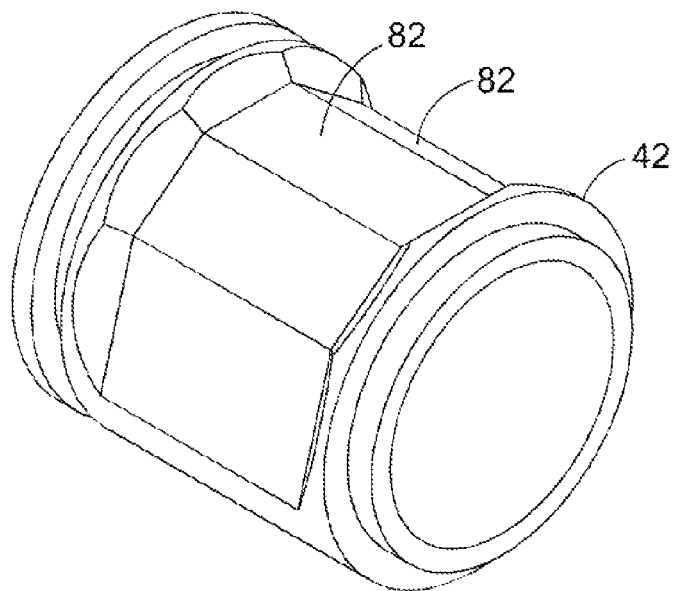
FIGS. 6-7 are perspective views of the rotating element showing its exterior and full cross section respectively.
Figure 7:
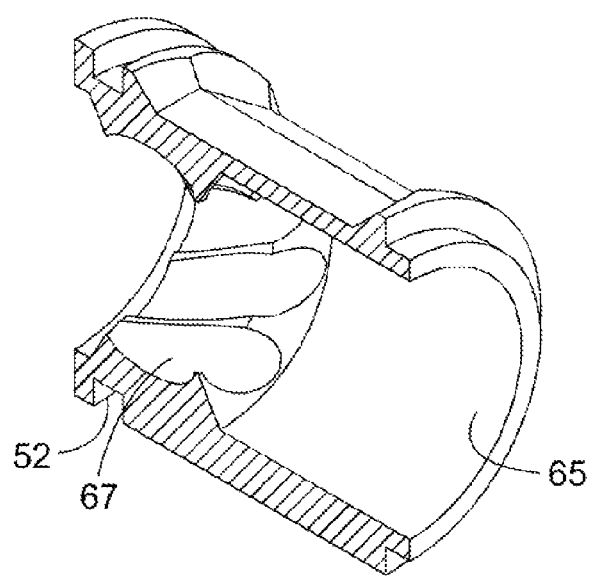
Figure 8:
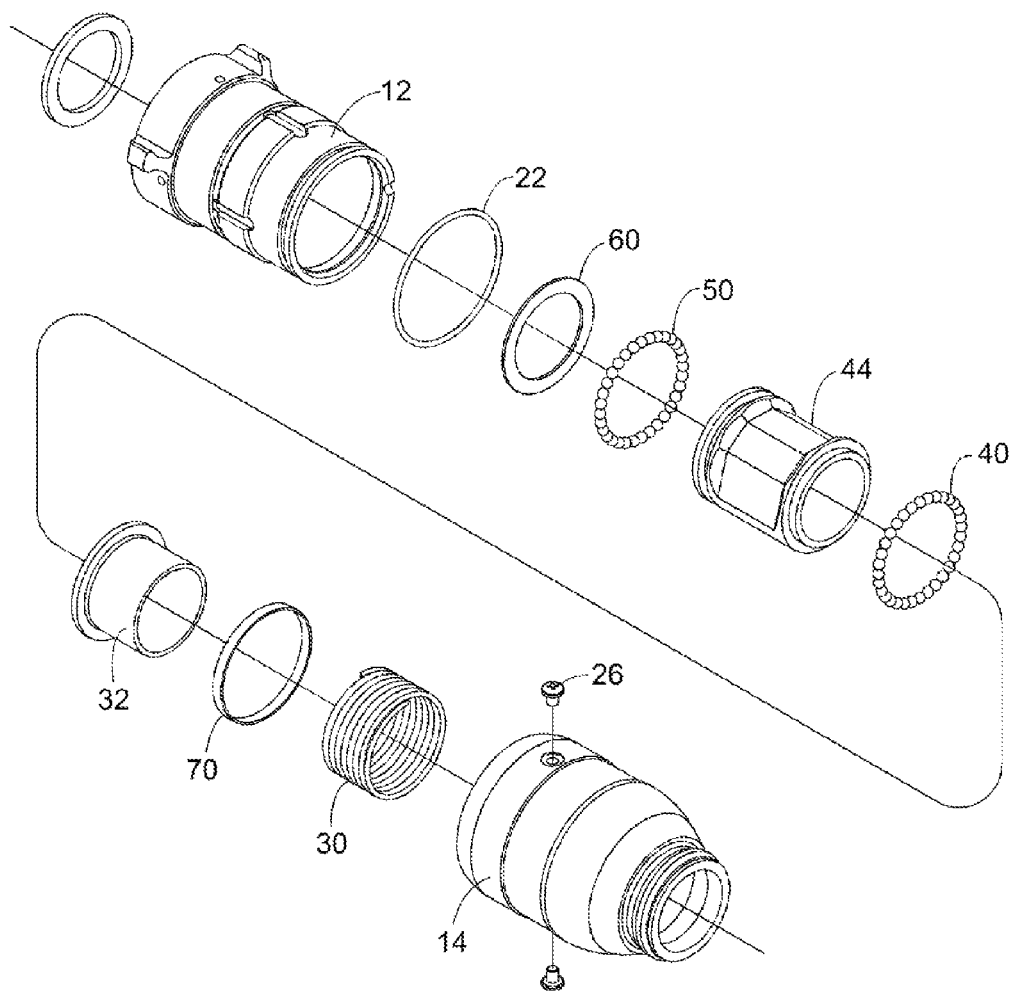
FIG. 8 is an exploded perspective view of the indicator seen in FIG. 1

FIGS. 6-7 depict most clearly the details of the spinner 44. The slanted surfaces may alternately be made as helical fins, holes, vanes running to the center, or as shown with an angled inlet face 80 that sheds stringy debris to avoid clogging. In the preferred embodiment, the slanted surfaces are formed by a circle of slanted holes drilled into a solid aluminum bar. When the bar is hollowed out to form the waterway, the angled inlet face and open waterway form the self-shedding shape desired.

Rotation imparted to the spinner yields a vibrating haptic force because the exterior shape of the spinner has portions of its cylindrical exterior cut away exposing faceted faces 82 and providing an off-centered mass. In other words, the spinner 44 rotates about an axis which is not coincident with its centroid of mass. An eccentric exterior mass may be machined by milling the faceted exterior shown. However, an eccentric mass can also be formed by casting or molding a spinner with a smoother profile, or by retention of one or more heavy weights within corresponding pockets if desired.

Various levels of haptic feedback can be obtained by adjusting the number, size, and tilt of the slanted holes, as well as the diameter of the bored surfaces within the waterway of the spinner. In addition, the eccentric mass may be made larger or smaller by geometry as well as by density of the material chosen. It was found that these factors can all change the frequency and magnitude of the vibration thereby altering the haptic feel. For example, the spinner can be made to rotate with such a high frequency that forces are not readily detectable with a gloved hand or with such a large magnitude that it would shake one's wrist beyond the point of annoyance to pain or physical injury. The ideal frequency and magnitude are a matter of preference and are being studied to determine the most desirable setting, which is believed to be one in which the haptic sensation is distinct, yet not objectionable.

One system that provides a useful amount of haptic feedback uses a spinner that weighs 0.26 pounds (0.12 kg), with a mass that is offset from the centerline by 0.20 inches (5.1 mm). This spinner spins at about 3000 rpm at 150 gpm (570 liters/min). Its speed is linear with flow when operating at flows above the set point.

Once spinning commences, additional flow will increase the frequency of vibration proportional to flow.

Figure 1:
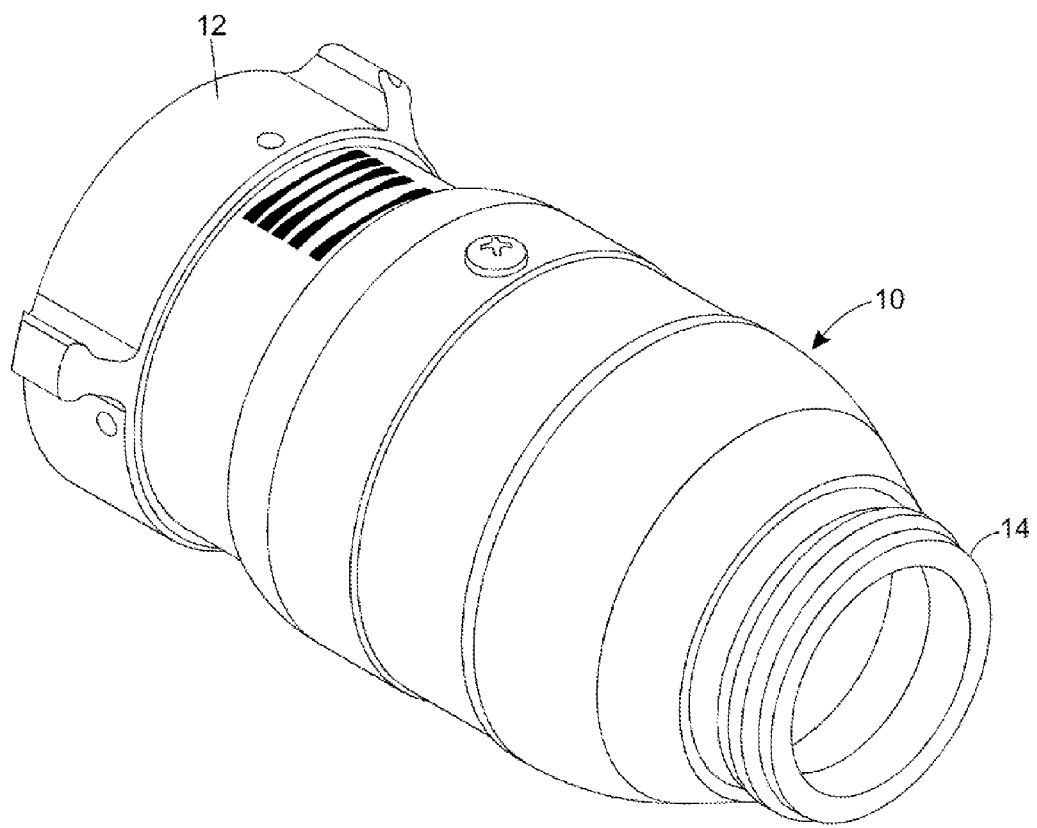
FIG. 1 is a perspective view of one type of haptic flow indicator that has a fire hose inlet connection and a fire hose outlet connection
Figure 4:
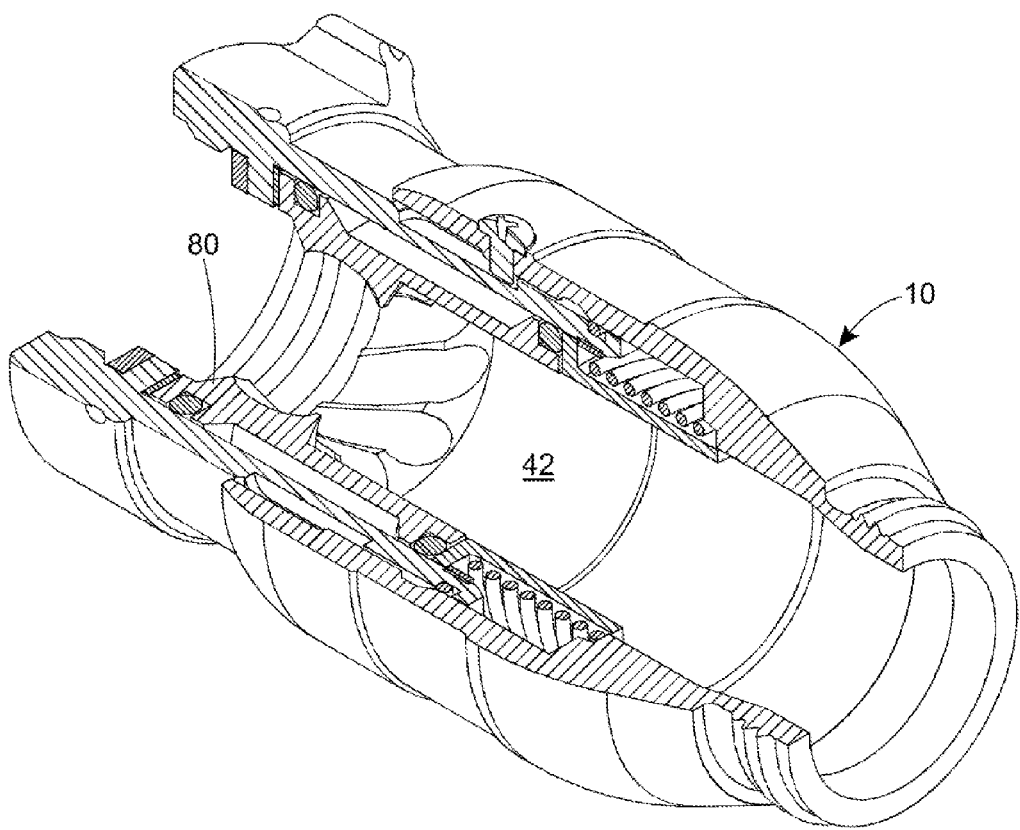
FIG. 4 is a quarter section perspective view of indicator in FIG. 1
Figure 5:
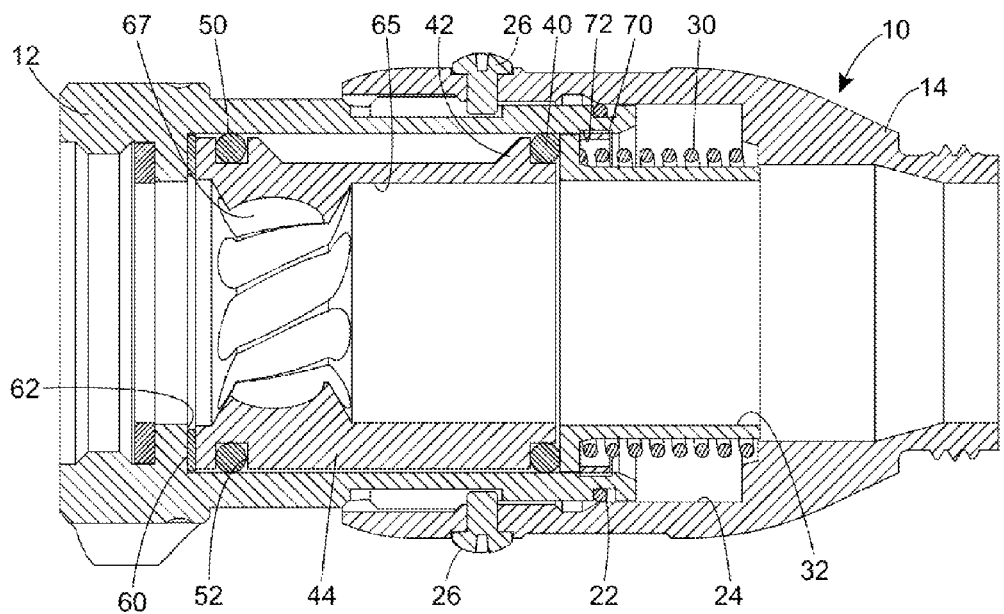
FIG. 5 is a full cross-sectional view of indicator in FIG. 1

In alternate embodiments, the indicator of FIG. 1 could provide haptic feedback by use of an electric motor that has an eccentric weight driven by a battery that is activated by a flow switch. In this alternate embodiment, the energy to drive the indicator is provided by a battery instead of by the motive energy of the flow. This embodiment has the advantage of no moving parts within the waterway, and the only obstruction in the waterway is a flow switch. However, batteries must either be periodically changed, or recharged.

Another embodiment uses an electric motor with an eccentric weight, the motor being driven with electricity generated from the flow of water spinning a non-eccentric spinner. This spinner could include permanent magnets that form the rotor of a generator and electromagnetically engage field coils on the exterior of the inlet, which form the generator's stator. In another embodiment, magnets could be used to provide an eccentric mass to a spinner, with the spinning magnets both providing haptic feedback and also generating electricity by engaging coils on a stator.

The electricity generated in either embodiment could be used for various purposes. For example, it could light LED lights when the flow exceeds the threshold, it could power a microprocessor that counts magnet pulses and drive a display to indicate a flow that is proportional to the pulse count, or it could provide an audio indication of the flow.

In another embodiment, electricity generated by the rotating element could be used to wirelessly transmit flow information to the fire engine.

In another embodiment, the gripping surface may change shape when the set point is reached. For example a solenoid plunger could be extended or retracted to give haptic sensation feedback on a one-time change of state (on/off) basis, or in a repetitive manner as a throbbing sensation or vibration to continuously remind the firefighter that the flow remains adequate.

In another embodiment, a flow meter mounted on a fire engine could wirelessly transmit an on/off signal to a nozzle equipped with an electric motor driving an eccentric weight.

Figure 10:
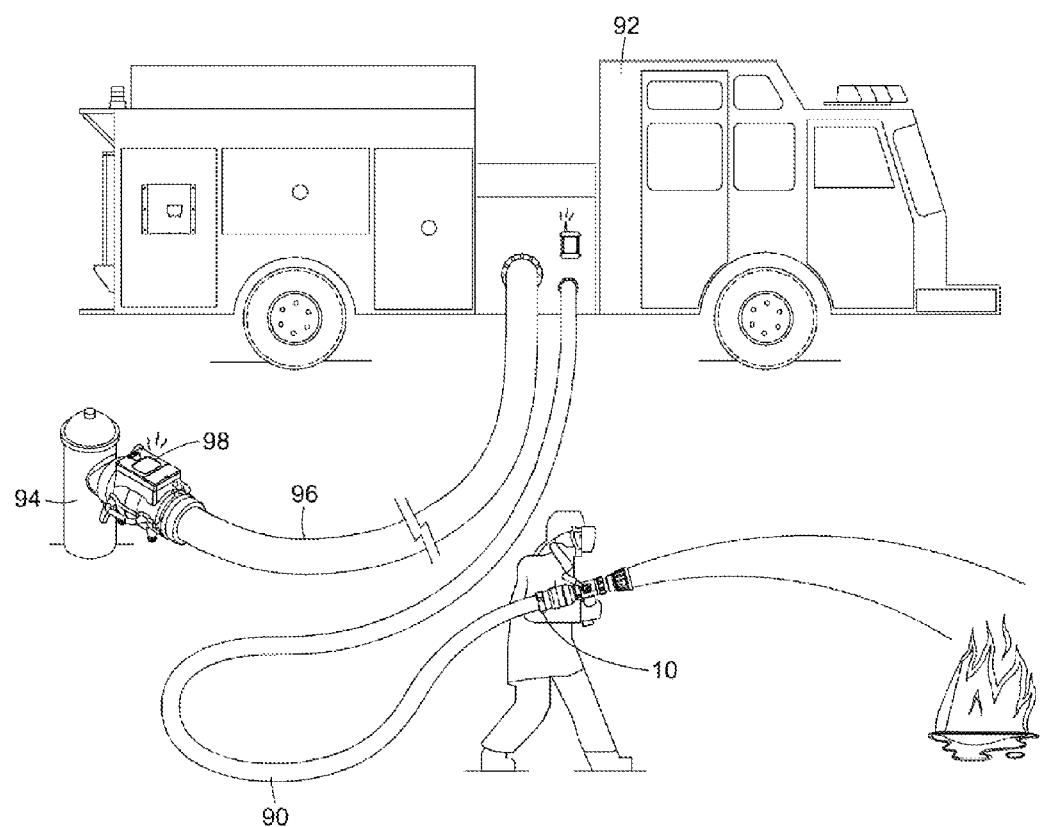
FIG. 10 is a schematic view showing how a haptic flow indicator can be used on a fire hose that receives water from a fire hydrant via a fire engine.

The schematic view of FIG. 10 shows how a haptic flow indicator can be used on a fire hose 90. The indicator 10 is connected to the hose and the nozzle and forms an extension of the nozzle. During use, the firefighter can sense its vibration and apply an extinguishing agent on the fire from a distance. The fire hose most generally receives water from a fire engine 92 as operation from a hydrant or open water source frequently does not provide enough energy to project the water sufficiently. The fire engine may receive its water from a hydrant 94 or open water source by way of an inlet fire hose 96. Flow of water discharged from the hydrant may be controlled remotely by use of an auxiliary valve 98 on the hydrant.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A flow indicator that is for use with a fire hose nozzle and has a rotating element whose mass rotates about an axis that is not coincident with the centroid of mass of the element and provides a firefighter with haptic feedback of water flow.

2. The indicator of claim 1, in which the indicator is powered solely from the motive energy of water flowing through the indicator.

3. The indicator of claim 1, in which a set point in the operating flow range of the indicator divides the flow range into a first region in which the haptic feedback does not occur and a second region in which the haptic feedback does occur.

4. The indicator of claim 3, in which the first region encompasses flow rates less than the set point.

5. The indicator of claim 3, in which the set point is adjustable.

6. The indicator of claim 3, in which the indicator can be adjusted to more than one set point.

7. The indicator of claim 1, in which the indicator includes a water inlet that receives water from a fire hose, and a water outlet.

8. The indicator of claim 7, in which the water outlet includes a fire hose connection.

9. A flow indicator for firefighting equipment that has:
a waterway for liquid;
an eccentric spinner that is mounted for rotation when flow through the waterway falls in a selected range and provides a discernable haptic feedback to a firefighter using the equipment when the flow rate passing through the indicator is in the selected range.

10. A flow indicator as recited in claim 9, in which:
the spinner is mounted for rotation in the waterway; and
an adjustable spring biases the spinner against a surface in a manner that inhibits rotation of the spinner unless liquid flow through the waterway exceeds a set point and permits the spinner to spin when the liquid flow exceeds that set point, providing the discernable haptic feedback to the firefighter when the liquid flow exceeds the set point.

* * * * *